United States Patent
Hall

(10) Patent No.: US 7,890,484 B1
(45) Date of Patent: Feb. 15, 2011

(54) METHOD AND APPARATUS FOR SELECTING SERVICES BASED ON BEHAVIOR MODELS

(75) Inventor: Robert J. Hall, Berkeley Heights, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 211 days.

(21) Appl. No.: 11/272,310

(22) Filed: Nov. 10, 2005

Related U.S. Application Data

(60) Provisional application No. 60/626,693, filed on Nov. 10, 2004.

(51) Int. Cl.
G06F 7/00 (2006.01)
G06F 17/30 (2006.01)

(52) U.S. Cl. ............... 707/705; 707/786; 707/797; 707/810

(58) Field of Classification Search ............ None
See application file for complete search history.

(56) References Cited

U.S. PATENT DOCUMENTS

| | | | | |
|---|---|---|---|---|
| 5,721,832 A * | 2/1998 | Westrope et al. | ............ | 705/27 |
| 6,021,402 A * | 2/2000 | Takriti | ............ | 705/412 |
| 6,151,601 A * | 11/2000 | Papierniak et al. | ............ | 707/10 |
| 6,732,093 B2 * | 5/2004 | Vally et al. | ............ | 707/4 |
| 7,080,078 B1 * | 7/2006 | Slaughter et al. | ............ | 707/10 |
| 7,395,540 B2 * | 7/2008 | Rogers | ............ | 719/310 |
| 2002/0082912 A1 * | 6/2002 | Batachia et al. | ............ | 705/14 |
| 2002/0120554 A1 * | 8/2002 | Vega | ............ | 705/37 |
| 2002/0120685 A1 * | 8/2002 | Srivastava et al. | ............ | 709/203 |
| 2004/0030747 A1 * | 2/2004 | Oppermann | ............ | 709/203 |
| 2004/0073569 A1 * | 4/2004 | Knott et al. | ............ | 707/104.1 |

* cited by examiner

*Primary Examiner*—Khanh B Pham
*Assistant Examiner*—Azam Cheema

(57) ABSTRACT

A method and apparatus for providing service discovery are disclosed. Specifically, each service provider builds or constructs a behavior description or model of its service and, in turn, stores and publishes the behavior description. Each behavior description is implemented in accordance with a set of shared ontology of terms for a particular domain. In turn, a user may generate a query associated with service discovery that will be capable of exploiting the behavior descriptions for a plurality of services.

20 Claims, 6 Drawing Sheets

METHOD AND APPARATUS FOR SELECTING SERVICES BASED ON BEHAVIOR MODELS

This application claims the benefit of U.S. Provisional Application No. 60/626,693 filed on Nov. 10, 2004, which is herein incorporated by reference.

The present invention relates generally to a method and apparatus for selecting services, e.g., based on compliance with formally specified properties.

BACKGROUND OF THE INVENTION

As users continue to rely on finding products and services on the Internet, the users must rely on the search tool to appropriately present pertinent search results. Unfortunately, Internet search tools have trouble making semantically meaningful distinctions among candidates in response to a search request, thereby often leaving the user with too many alternatives to explore. For example, a search on the Internet may return over 82,600 links in response to a search string "book locator". This search string may be entered by a user to search for a service relating to locating a book for a customer. However, most of the candidates from the search are simply web pages containing the phrase. A few candidates are actually services for locating books as intended by the user. However, even some of these pertinent candidates may be undesirable choices for a given user for one reason or another (e.g., a delivery price is too high, an undesirable privacy policy, etc).

Thus, a need exists for a method and apparatus for selecting services in response to a search request that is based upon semantically meaningful criteria, e.g., based on compliance with formally specified properties.

SUMMARY OF THE INVENTION

In one embodiment, the present invention provides a method and apparatus for providing service discovery. Specifically, each service provider builds or constructs a behavior description or model of its service and, in turn, stores and publishes the behavior description. Each behavior description is implemented in accordance with a set of shared ontology of terms for a particular domain, e.g., in a medical service domain, in a legal service domain, in a book locating domain, in a financial service domain, in a real estate service domain and so on. In turn, a user may generate a query associated with service discovery that will be capable of exploiting the behavior descriptions for a plurality of services. For example, the query may comprise a temporal logic query (e.g., in a format having a temporal logic formalism) that can be executed to analyze a plurality of behavior descriptions or models. The purpose of the analysis is to narrow the field to discover a set of pertinent candidates that truly have the desired capability in providing the desired services.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
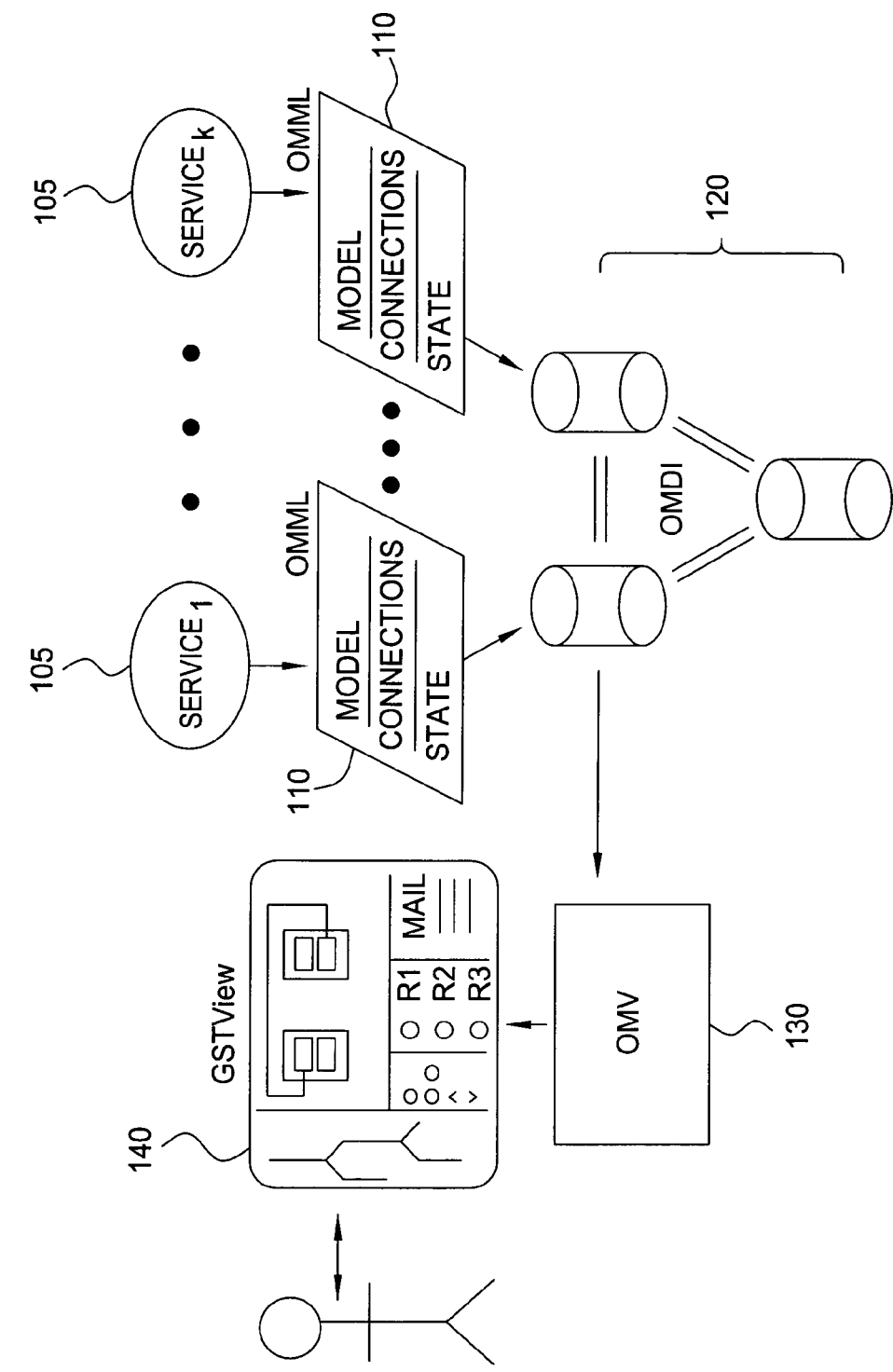
FIG. 1 illustrates an exemplary distributed modeling framework in accordance with the present invention.

Interface descriptions, while adequate for describing relatively simple or uniform functionality, are too abstract to properly describe entities as complex as e-commerce services or feature rich telecommunications services. In one embodiment, the present invention discloses that services can be described by executable specification behavioral models, i.e., using behavioral models as service descriptions. Specifically, at least three capabilities: 1) service discovery, 2) validation, and 3) execution monitoring, can be improved in accordance with the present invention.

Users and developers of Internet-scale service networks face several challenging tasks. For example, would-be users must discover appropriate service nodes; users must validate the nodes' behavior with respect to their personal requirements; and, in some cases, the user or node stakeholder may wish to monitor the execution of the service for compliance with expectations. Each of these tasks requires service descriptions for the nodes of the system. That is, the nodes must somehow publish abstracts of their capabilities so that clients (end users, tools, other service nodes, and administrators) can understand what each node offers.

To illustrate the present invention, consider the following scenario. A user wishes to locate a particular book, either new or used, and have it delivered to the user as quickly as possible, but with both book price and delivery charge within reasonable specified limits. For example, if it is new, the user will accept paperback, but if it is used, the user will accept only hardback (used paperbacks tend to be in poor condition). The user is also concerned that the vendor to whom the user may provide personal information will not keep such information beyond the end of the transaction and, for example, spam the user with advertisements. So, the user types "book locator" into a favorite search engine, i.e., effectively using naming for the service description. Unfortunately, the search may return some 82,000 links to web pages that simply contain the given phrase. Some of these are actually book locator sites, whereas many other web pages simply contain the typed phrase. If the search tool allows it, the user may refine the search by specifying a functional input interface, including inputs for logging in as a registered user and specifying the book title and author. Suppose this narrows the search to 52 sites, all of which are book locator services. The user still has no idea which of these services will meet the user's personal requirements for information privacy and book type/origin preferences. The user's only alternative at this point would be to try each one successively and hope to deduce in advance of the transaction (from documentation or reputation) whether the preferences will be met.

However, if services from service providers were described by behavioral models in accordance with the present invention, the user could express the desired properties above (e.g., privacy, sale preferences) in a temporal logic formalism and have a tool analyze the models, thereby narrowing the field to discover the few true candidates (or candidate services) having the capabilities desired by the user. In one embodiment, once the user discovers a candidate (or candidate service), the user can validate selected candidates from the smaller list (e.g., using the models) for conformance to other personal requirements that may be important to the user, prior to risking personal information, time, or money. And, with appropriate infrastructure, the user may monitor the execution of the service to see that the service provider complies with the abstract behavior in its model.

For the present invention, a behavioral model is a description of the behavior of a reactive system at some agreed upon level of abstraction. A reactive system is a state machine (not necessarily finite state) that changes state and produces output events in response to input events received from its environment. Reactive system models can be expressed in a wide variety of languages and frameworks, including finite state machines, hierarchical finite state machines, Unified Modeling Language (UML), infinite state machine languages, and the like.

FIG. 1 illustrates an exemplary distributed modeling framework 100 in accordance with the present invention. In one embodiment, the modeling framework is an "OpenModel" framework comprising of four main components. (a) The OpenModel Modeling Language (OMML) 110 is an XML-based behavioral model interchange and integration language that represents executable specification models, connections between nodes, (abstract) state information, and domain specific ontology. Each service 105 publishes its description in OMML format. Technically, each node's description is a model instance, which includes not only the behavioral model (which may be common to many nodes) but also instance-specific data and connection information. (b) The OpenModel Distribution Infrastructure (OMDI) 120 (broadly referred to as a registry) comprises of protocols and APIs for publishing and retrieving model instance service descriptions in the Internet. (c) The OpenModel Validator (OMV) 130 computes via symbolic simulation a generalized scenario tree (GST) relevant to a given validation task, which represents symbolic classes of possible alternative evolutions of the distributed computation. (d) the GSTView tool 140 is an interactive user interface tool supporting visualization of (classes of) behaviors as well as automated checking of temporal logic properties. GSTView can be built on top of the OMV symbolic simulation engine.

In one embodiment, the OpenModel Modeling Language (OMML) describes synchronous executable specification models of service nodes, connections between service nodes, (abstract) state of the service nodes, and domain specific information to allow standardization within a domain of the terminology used to describe service applications. Behavioral models of the services are described at a richer and more detailed level than simple I/O interfaces. OMML is a function rich procedural language that supports descriptions of unbounded state spaces in terms of domain relevant function/object theories. In OMML a behavioral model reacts to input events by changing state values and producing output events. State transitions and output events are expressed procedurally in terms of functions and data types that may range from Booleans to integers, strings, lists, structured objects, and general mathematical functions operating on user-defined types. OMML also allows composition of services by providing ways to specify connection declarations that define how an output event from one model (service) is mapped to an input event of another model (service).

In one embodiment, OpenModel assumes that within a domain (e.g., in a medical service domain, in a legal service domain, in a book locating domain, in a financial service domain, in a real estate service domain and so on), stakeholders will standardize shared domain ontologies that define terminology, functions, input event signatures, and logical semantics for objects that must be communicated between nodes. This not only helps with interoperation of models, it also tends to dictate a common level of useful abstraction. For example, in the book finding domain, this level may operate on book titles, money, credit card numbers, etc. It may abstract away many details like copyright dates, currency conversion, and credit card validation strings. In an email domain, models are stated in terms of email messages, email addresses, and cryptographic keys, abstracting away details relating to reliable queuing, attachments, and date formats. In one embodiment, service specifications, connection information, abstract state data, and shared ontologies can be published through the Internet using the OpenModel Distribution Infrastructure (OMDI).

The OpenModel Validator (OMV) supports validation by computing GSTs. These represent possible evolutions of a distributed computation in response to a designated set of input events. In MSDS applications, stakeholders often do not know detailed behavioral and state information about nodes controlled by others. For example, in a book buying web service application it is likely that most stakeholders will not know detailed inventory, price lists, and private customer information held by one book vendor.

In one embodiment, the OMV computes a symbolic simulation of the relevant portion of the large scale distributed system, dynamically deducing and retrieving node models as needed. The symbolic nature of OMV allows leaving placeholders for unknown state information (e.g. state information that is purposely withheld by a stakeholder, such as price lists or private customer data). Also, service nodes relevant to a certain personal requirement are dynamically identified and the executable specification models associated with these nodes, together with the information about the state of the service and information about the connections between output and input events are retrieved. Connection information is used to compute the relevant set during the course of validation. Thus, node model instances are dynamically retrieved as needed during the validation process. OMV can also make use of a user's assumptions about the dynamic states of service nodes of the system.

GSTView is a graphical interactive tool built on top of OMV that helps the user to validate personal requirements.

To assist in understanding the present invention, an e-commerce web service "BookFind" application is now described. The application is concerned with the ordering and purchase of books via the web, followed by the physical or electronic delivery of the books.

Figure 2:
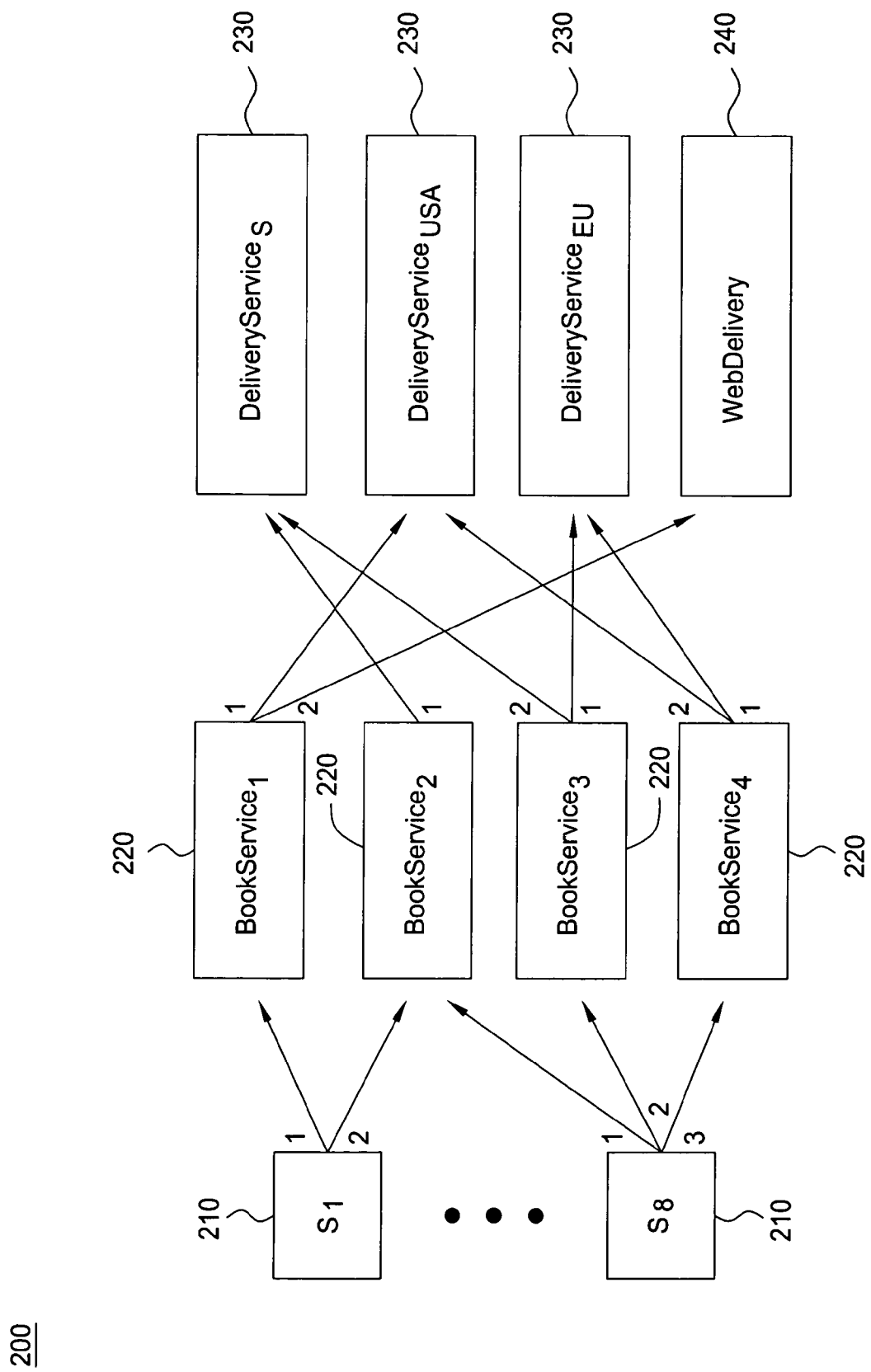
FIG. 2 illustrates an example of a web service application related to the present invention.

FIG. 2 shows the BookFind example. It is comprised of four different types of services: BookFinder 210 (labeled as $S_1$-$S_8$), BookService 220, DeliveryService 230, and Web-Delivery 240. A BookFinder server accepts book requests from users based on a pre-defined electronic interface form containing information about book title, maximum book price, delivery time constraints (e.g., urgent vs. normal), customer's email address and delivery address, and credit card number. For each book request, a BookFinder attempts to locate and purchase the book from one of the book retailers. A BookService represents a book retailer that accepts a request from BookFinder and checks its stock for the book. When a BookService has the book and the book price is within the maximum price that the user has specified in the book order, it tries to find a delivery service that can deliver the request following the requested delivery constraints. Each BookFinder has an ordered list of associated BookServices and each BookService has an ordered list of DeliveryServices from which the services can be used. The ordering is indicated in FIG. 2 by numbers on the message arrows.

When a BookService cannot fulfill the request, either because it does not have the book, the price of the book is higher than the user's maximum, or none of the DeliveryServices associated with it can deliver the book within the constraints, BookService informs BookFinder that it cannot provide the service being requested. BookFinder then attempts to identify another BookService that can. In the case in which none of the BookServices and/or DeliveryServices can provide the request, BookFinder notifies the user of the failure. Otherwise, BookFinder acknowledges the request to the user and sends an event to the credit card company directing a charge to the user's account. For simplicity, FIG. 2 does not illustrate the modeling of the credit card transaction.

In this illustrative example, FIG. 2 considers eight BookFinders, four BookServices, and four DeliveryServices. The various BookServices and DeliveryServices have different characteristics. For instance, BookServices can differ in whether they (a) maintain a database of personal information about customers, (b) send spam messages to innocent customers either book-related or not, (c) offer both electronic and physical delivery of books, or offer only physical delivery, and several others. On the other hand, DeliveryServices can differ on the locations of delivery (e.g. world-wide, P.O. Box, and normal addresses), or on the speed of delivery (e.g. overnight vs. normal 3-8 day delivery), or the price of delivery (e.g. deliveries in Europe are cheaper than in the U.S.A., or vice-versa), or on the fact that they may require a signature on delivery.

In one embodiment, this example was carried out within the OpenModel framework. For each BookFinder, BookService, and DeliveryService in the example, OMML documents were created for their behavioral models, their connection descriptions, and their (partial, abstract) state descriptions. These were represented within a simulated MSDS; ultimately, once OMDI is implemented, these would be distributed throughout the actual nodes or put into a central registry. In addition, semantic information including types, functions, and reasoning axioms (e.g., rewrite rules, decision procedures, and concrete evaluators) are represented in OMML theories and ontologies. Behavioral models may contain references to theories, input and output event declarations, state declarations, and procedural event handlers. Event handlers may describe how the service reacts to input events. Connection descriptions may specify how services are connected to each other. For example, a connection may describe the fact that a "DeliveryRequest" output event generated by a BookService becomes a "DeliverBook" input event to a DeliveryService, and another declares that a "Delivery Confirmation" output event from a DeliveryService becomes a "DeliveryResult" input event to a BookService. Beyond event transformation, connections may also specify routing of events from one model instance to another.

As one introduces more semantic details into service descriptions, the precision of service discovery improves. Thus, the present invention expresses task requirements as formal properties, describes services as (abstract) behavioral models, and uses lightweight automated reasoning tools to select candidates that do not violate the properties. It should be noted that the present invention can be instantiated using any distributed modeling formalism, but the present invention is illustratively described using the OpenModel framework and terminology.

Figure 3:
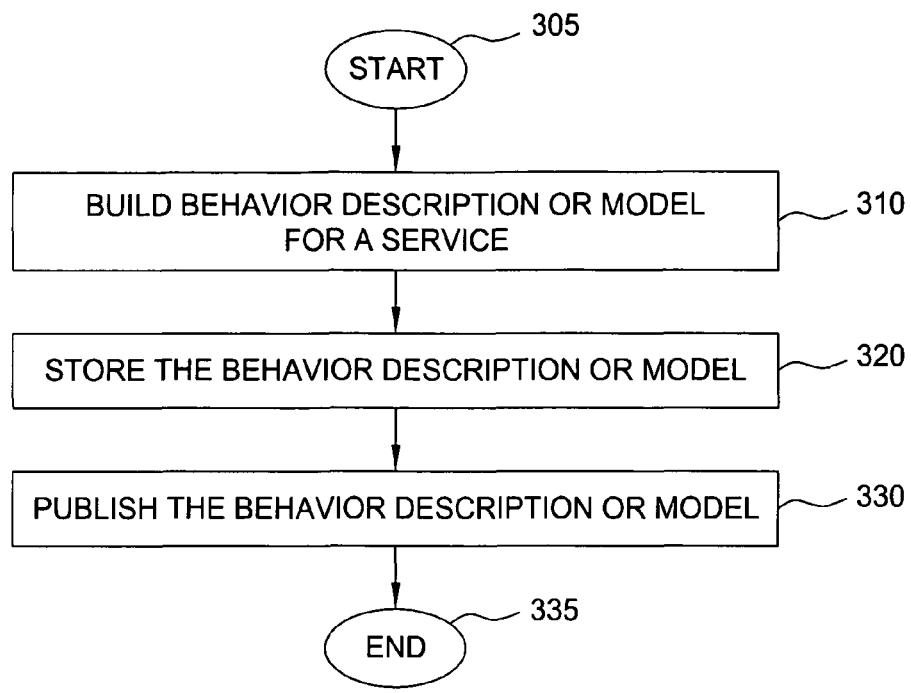
FIG. 3 illustrates a flow chart of an exemplary method for generating a behavior description or model for a service.

FIG. 3 illustrates an exemplary flow chart of a method 300 for generating a behavior description or model for a service. Method 300 starts in step 305 and proceeds to step 310.

In step 310, method 300 builds a behavior description or model for a service. In step 320, method 300 stores the behavior description or model, e.g., into a service database. Finally, in step 330, method 300 publishes the behavior description or model, e.g., on the Internet and ends in step 335. Once a plurality of services has built respective behavior descriptions or models, a more accurate service discovery query can be deployed.

Figure 4:
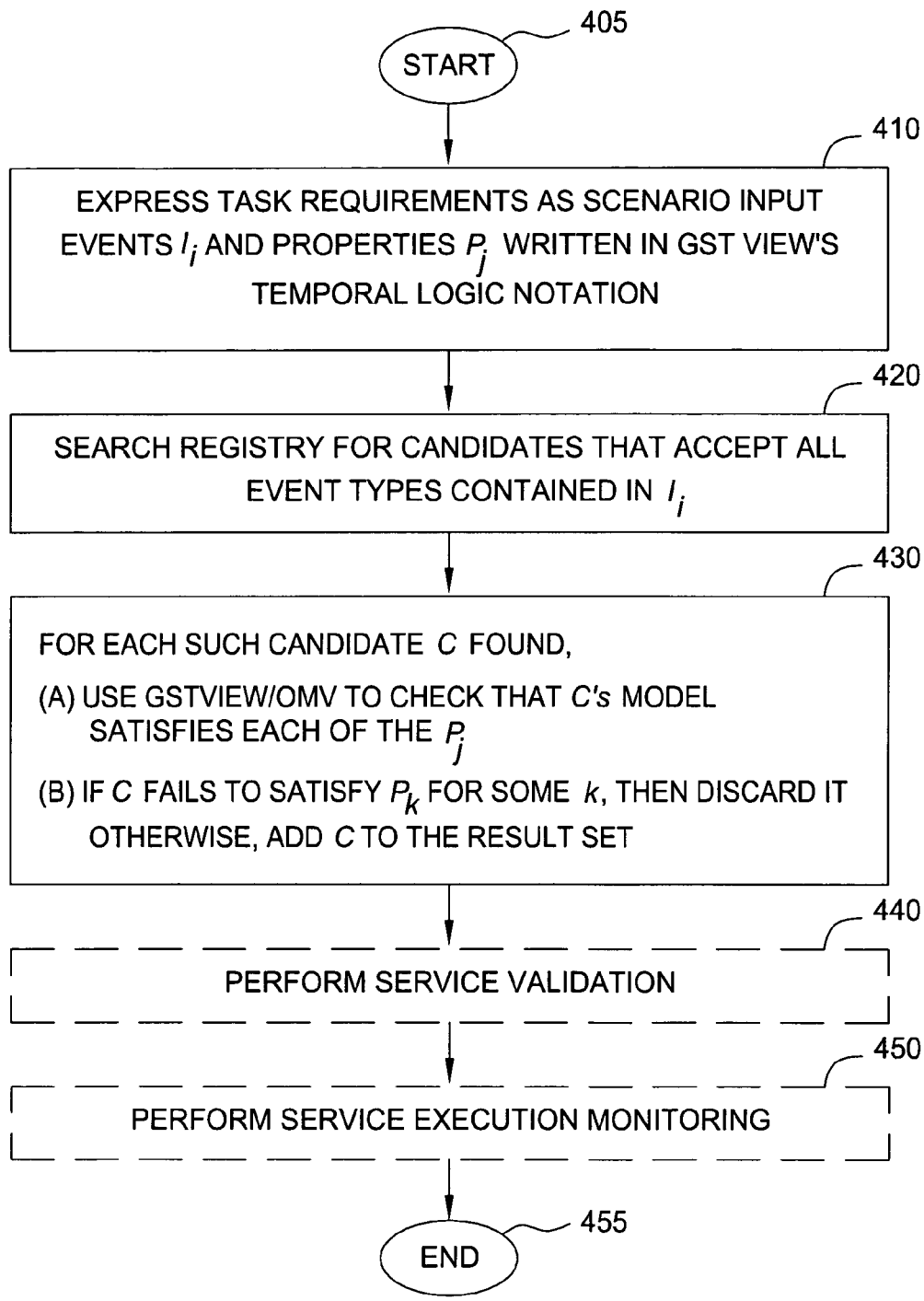
FIG. 4 illustrates a flow chart of an exemplary method for providing a service discovery, e.g., an OpenModel Service Discovery (OMSD) method.

FIG. 4 illustrates a flow chart of an exemplary method 400 for providing a service discovery, e.g., an OpenModel Service Discovery (OMSD) method. Method 400 starts in step 405 and proceeds to step 410.

In step 410, method 400 expresses a service discovery query in terms of task requirements, e.g., as scenario input events $I_i$ and properties $P_j$ written in temporal logic notation. For example, a user may generate the query using the GST View.

In step 420, the method 400 searches a registry for candidates that accept all event types contained in $I_i$.

In step 430, for each candidate that is found, method 400 checks to see whether a candidate's model satisfies each of the properties stated in the query. If the candidate fails to satisfy one of the properties (e.g., violation of a semantic property), then the candidate is discarded. Otherwise, the candidate is retained in a result set.

In step 440, method 400 may optionally perform a service validation of the retained candidate. A detailed description for performing service validation is provided below.

In step 450, method 400 may optionally perform service execution monitoring. A detailed description for performing service execution monitoring is also provided below. Method then ends in step 455.

To illustrate the power of the present method, a search was performed in an exemplary BookFind domain. First, eight distinct book locator services ($S_1$-$S_8$) are defined, each one combining different book vendor subsets and (hence) also different delivery service subsets. A collection of task requirements is then defined, e.g., stating them in GSTView's property notation. GSTView terms each property checker a "ReqMon", for "requirement monitor". GSTView's symbolic simulation and reasoning tools (a form of function rich symbolic model checking) is then used to check each ReqMon for each of $S_1$-$S_8$. Table 1 shows the results.

TABLE 1

| Requirement Query | $S_1$ | $S_2$ | $S_3$ | $S_4$ | $S_5$ | $S_6$ | $S_7$ | $S_8$ | Total Time |
|---|---|---|---|---|---|---|---|---|---|
| CC Number | * | ok | ok | * | ok | * | * | * | 4.37 |
| No Web Del | * | ok | ok | * | ok | * | * | ok | 3.93 |
| Urgent Avail | ok | ok | ok | ok | ok | ok | ok | * | 4.37 |
| Reas Del Chg: | | | | | | | | | |
| USA, normal | ok | ok | * | * | * | ok | * | ok | 3.87 |
| USA, urgent | ok | ok | * | * | * | ok | * | ok | 4.30 |
| EUR, normal | * | * | ok | ok | * | ok | * | ok | 4.18 |
| EUR, urgent | * | * | ok | * | * | * | * | ok | 4.24 |

For example, each row provides results for a single property. The left most column labels the requirement property being checked. The middle 8 columns provide the results for each of the eight services. "ok" means the service in that column passes the check, and "*" means at least one possible outcome of the service violates the check. The last column provides the total time to check that property alone for each of the eight services (in seconds). The "CC Number" requirement is passed if the service deletes the user's credit card number from its state by the end of the transaction; it is failed if the service may retain the credit card number. The "No Web Del" requirement is passed if there is no possibility that the book service could choose to deliver the book by web delivery. "Urgent Avail" is true of a service if at least one possible outcome is to deliver the book urgently (e.g. overnight). The bottom four requirements (labeled in the aggregate as "Reas Del Chg") check whether the maximum possible delivery charge of the service is "reasonable", which in this case means less than $20.00. For illustration, the ReqMon for this requirement is expressed in a notation equivalent to:

[ ]((?eventop="DeliveryConfirmation") &; (nth{2, ?eventargs)>20)).

The four cases are distinguished by where the delivery address is located (e.g., USA vs. EU) and whether the request is urgent or normal. These conditions are given in the input event list $I_i$ rather than the ReqMon itself.

To interpret these results for service discovery, note first that all eight services obey identical interfaces and conversation constraints, yet their names are all different. For simplicity here, it is assumed that they are all of the same component type; though this is irrelevant to OMSD. Thus, the more abstract discovery techniques would return all eight as candidates no matter what the user's personal requirements set may be. The filtering phase fails completely in this example for those approaches. The reason is that there are functional characteristics of the services that are important to the users and yet not captured in the interfaces, because they pertain to the way in which the composed book finding services carry out the task.

To use an OMSD-based tool, the user would specify which subset of the requirements above were important to the task at hand. There are 40 such possible sets: anyone of the 8 subsets of the first three requirements, crossed with either no delivery charge requirement or exactly one of the four given ones. (8×(4+1)=40.) For example, suppose a user based in the USA needs urgent delivery, a delivery charge less than $20.00, will not accept web delivery, and will not accept a service that retains personal credit card information beyond the transaction. The only service having "ok" in rows 1, 2, 3, and the "USA/urgent" row is $S_2$, so that is the only candidate reported to the user.

Using Table 1, one can compute the size of the candidate set for each of the 40 requirement sets. The average candidate set size was 2.15. Of course, since naming, interface, and conversation based approaches always produce all 8 as candidates, these competing approaches had an average candidate set size of 8. Thus, in this example, OMSD improved precision by reducing candidate set size 73% on average. Clearly, precision improves as more requirements are added to the query. The average time cost per individual query is about 4.18 seconds. However, queries can be processed together (such as when the query set has four properties instead of one) more quickly than checking all properties individually. For example, checking the query containing all four of requirements 1, 2, 3, and the reasonable-delivery-charge property for USA/urgent (the worst case time) took only 5.92 seconds when performed together, whereas checking all four individually would have cost 16.97 seconds. This speedup is due to the fact that much of the time cost lies in the symbolic simulation (including result tree construction), which effort can be shared by multiple property checks. In summary, for this example, OMSD may reduce candidate set size by 73% (compared to existing approaches) and may process queries in under 6 seconds in all 40 cases.

Even with a more precise service discovery method as disclosed above, when a user must entrust money, personal information, or simply time to a complex service, the user will wish to determine in advance whether the candidate service complies with his personal requirements. This process of gaining confidence in the appropriateness of the service is termed validation.

GSTView is an OpenModel-based validation tool that uses the Assisted Symbolic Behavior Browsing (ASBB) approach. In one embodiment, it provides the following capabilities integrated in a multi-paned graphical user interface.

A graphical visualizer shows model instances as they are deduced to be relevant and retrieved by OMV. It also shows successively each step of the evolution within the current GST, including event generation and communication, state changes, branches due to missing information, and looping in node specifications. It is worth noting that if complete data states of all nodes are known, as might be the case in an enterprise network environment, this reduces to a graphical visualization of a concrete event-based simulation of the network.

A control pane allows the interactive user to control the symbolic simulation, either proceeding down the tree, backtracking up the tree, making assumptions about missing information, or annotating desirability of node actions within the tree.

A Requirements Monitoring pane shows the status (at the current GST node of the simulation) of each defined ReqMon. For example, green means "no violation", yellow means the reasoner was unable to deduce violation or nonviolation, and red means the requirement is definitely violated. ReqMons are definable by the user in a temporal logic style notation. ReqMons can be thought of as implementing symbolic model checking on a function rich infinite state notation.

A "GST-Overview" pane gives the user a global view of the computation tree and allows clicking on nodes to jump to any point in the computation. Each node is colored to indicate the status of ReqMons there.

A "Details" pane shows a textual representation of the full details of the action (event, state change, branch, loop, etc) at the current node of the GST.

The ASBB methodology supports both behavior browsing (e.g., inspection for validity) by the user of representative behavior classes as well as automated symbolic checkers for properties (and approximations of properties) when these can be formulated. Both capabilities are useful to a user. Some personal requirements are difficult or impossible to formalize and some are even unknown in advance of entering into the process. Thus, browsing (inspection) by the user is necessary. On the other hand, many properties are known in advance and are easily formalized; the systematicity and consistency of automation is a significant advantage in that case.

Simple properties can be formalized accurately and completely automated; for example, checking whether web delivery is possible through a given book finder. Such properties are easily expressed in ReqMons. More complex properties must be approximated. Information leakage and anonymity, for example, are remarkably difficult to formalize exactly. Instead, GSTView supports approximations (heuristics) which work like ReqMons, but the user must realize that there can be false positives and false negatives. When a property is so complex that no useful approximate checker can be thought of, GSTView supports noticers. These are simply temporal logic conditions that are checked for and brought to the attention of the user whenever they occur. There is no guarantee or expectation that such conditions represent requirements violations, because there is no computational way to guess one way or the other. Instead, the user must check them by inspection. A good example of this is the use of a noticer to detect every time a book service node sends an email message to the user. It is up to the user to inspect this node to determine if it is a legitimate part of the transaction or simply a spam advertisement. Finally, some properties are either too complex to formalize or else simply not thought of in advance by the user. Such properties can only be found by inspection.

To illustrate, the present invention can be applied to validate book finders using GSTView and to discover undesirable behaviors using all the mechanisms available: some were discovered by automated property checkers, some were discovered by approximate property checkers, some were discovered because a noticer brought the user's attention to a problematic action, and some were discovered purely through inspection. Examples of Identified Violations Include:

- a book retailer sending spam messages to its customers, discovered by a noticer pointing out the sending of the email message (automatically detecting spam content may not reliably be formalizable);
- an unacceptably high delivery cost, discovered by a ReqMon;
- unexpected failures to receive a book, such as by requesting urgent delivery to a "P.O. box" style address, discovered by a ReqMon leading to inspection;
- retention of personal information such as credit card number by a book retailer, detected by a ReqMon approximation to information leakage detection; and
- signature required on delivery when this is not acceptable to the user, discovered by inspection.

In summary, multiple violations of personal requirements were discovered in this example on a collection of task scenarios. These studies showed both that ASBB is effective and that each of the types of automation support was significantly useful in saving effort (e.g., with over 91% effort savings in all BookFind scenarios).

Note that those failures detected automatically by ReqMons could in fact be used in OMSD for service discovery, assuming they are conceived in advance of discovery. However, the noticers and inspections cannot be used in discovery; instead a later round of ASBB-based validation may be necessary.

Even though one has discovered good candidates and even though one has validated a candidate using ASBB, there may still be the possibility that a service will not perform according to its published service description. There are many possible reasons for this: the implementation could have bugs, the model could have bugs, or the model could purposely either leave out certain actions or purposely imply wrong actions. (e.g., an unscrupulous service provider may have incentive to lie in its published model about its behaviors to avoid liability or bad public relations.) These considerations lead one to desire a way to monitor the service implementation to see if it complies with its published description. The execution monitoring problem is to determine at run time of the service whether it obeys (conforms to) its service description.

However, there may be situations where it is impossible to monitor certain conditions, because an unscrupulous stakeholder in full control of a node will simply not allow the necessary visibility into his processes. For example, it is likely that one external to a company can never get a 100% guarantee that a database of customer information held by that company will never be abused in a clandestine fashion.

There are other cases, however, where monitoring is useful and desirable. If a node's service description becomes part of a legally binding service level agreement (SLA), or perhaps a government regulatory requirement, then the provider has incentive to ensure the service implementation conforms to it. Alternatively, when a service is hosted by a trusted third party, the third party can install and maintain the infrastructure necessary to allow monitoring.

In one embodiment, given a behavioral model of a service, the present invention can monitor the implementation using a computable abstraction map, "A". "A" maps implementation-level data items and events to corresponding model-level elements.

Figure 5:
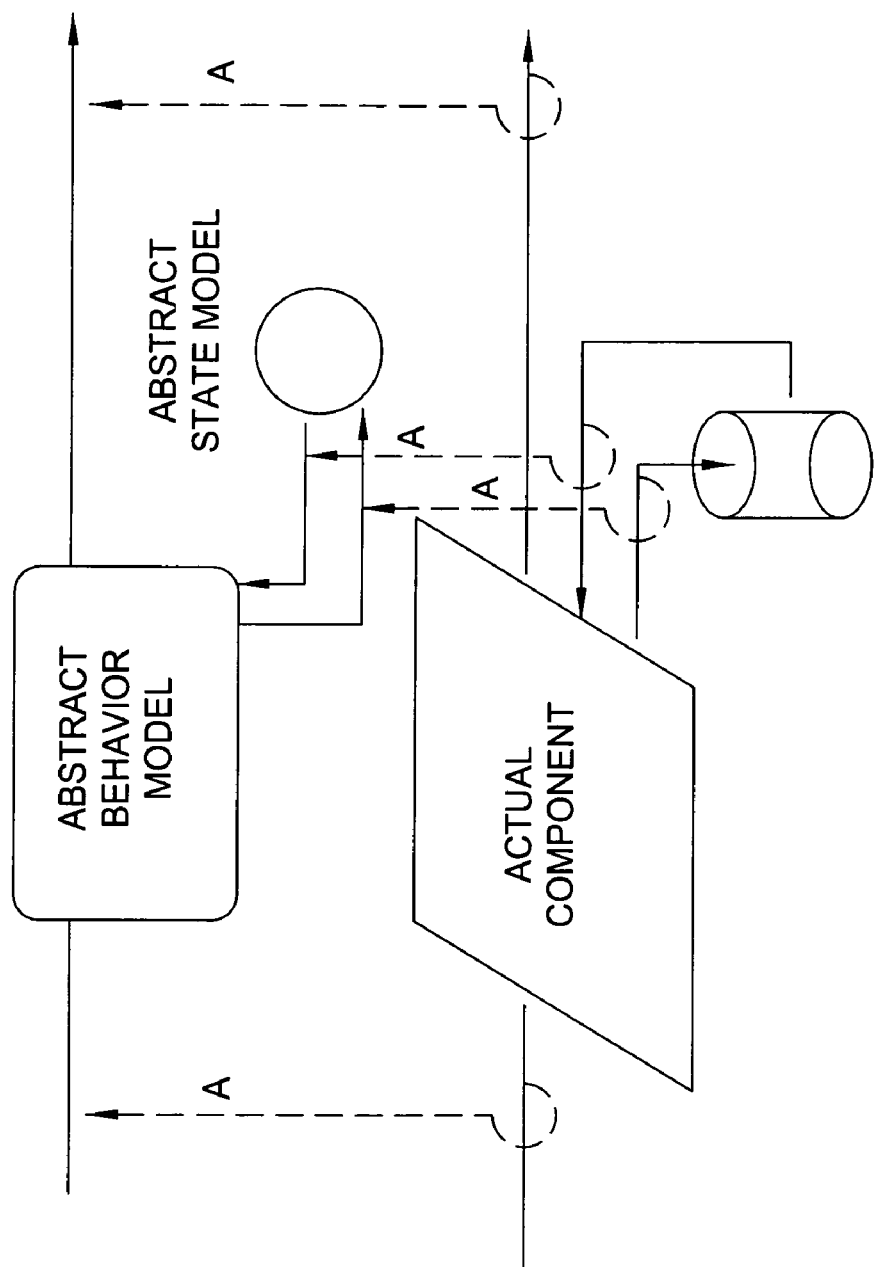
FIG. 5 illustrates a model-based execution monitoring architecture of the present invention.

FIG. 5 illustrates a model-based execution monitoring architecture 500. After mapping implementation level elements up to model-level objects, the model is simulated to determine if equivalent outputs and state changes are produced by both model and implementation. Run-time data gathering infrastructure is needed to capture or log real-time events during execution. Such data is then processed through A and compared to model results.

In the BookFind domain, the present approach would take an HTTP request for a book and map it to the model level objects defined for this purpose in the shared domain ontology. The database reads would be monitored and all such values used by the implementation's event handler would be mapped up to model-level state elements. Then, the model would be simulated on the inputs and state elements. The implementation responses (database writes and output events) would be mapped up to the model level as well. Then the model results and the mapped responses would be compared for equivalence. A user notification or log entry would result from any mismatches found.

Note that this need not be done on every implementation level event, since the implementation is likely to move very fast compared to model simulation. Instead, the present method can sample behavior randomly or periodically, in near-real-time or in an offline phase, to monitor compliance. This is possible because the present method monitors database reads as well as writes, so does not need to maintain consistency with every real time update. Note also that since the model level need not have a one-one correspondence with the implementation level, the computation done by A may be complex. The success of the present approach depends on the feasibility of computing A from recognizable implementation-level events.

Figure 6:
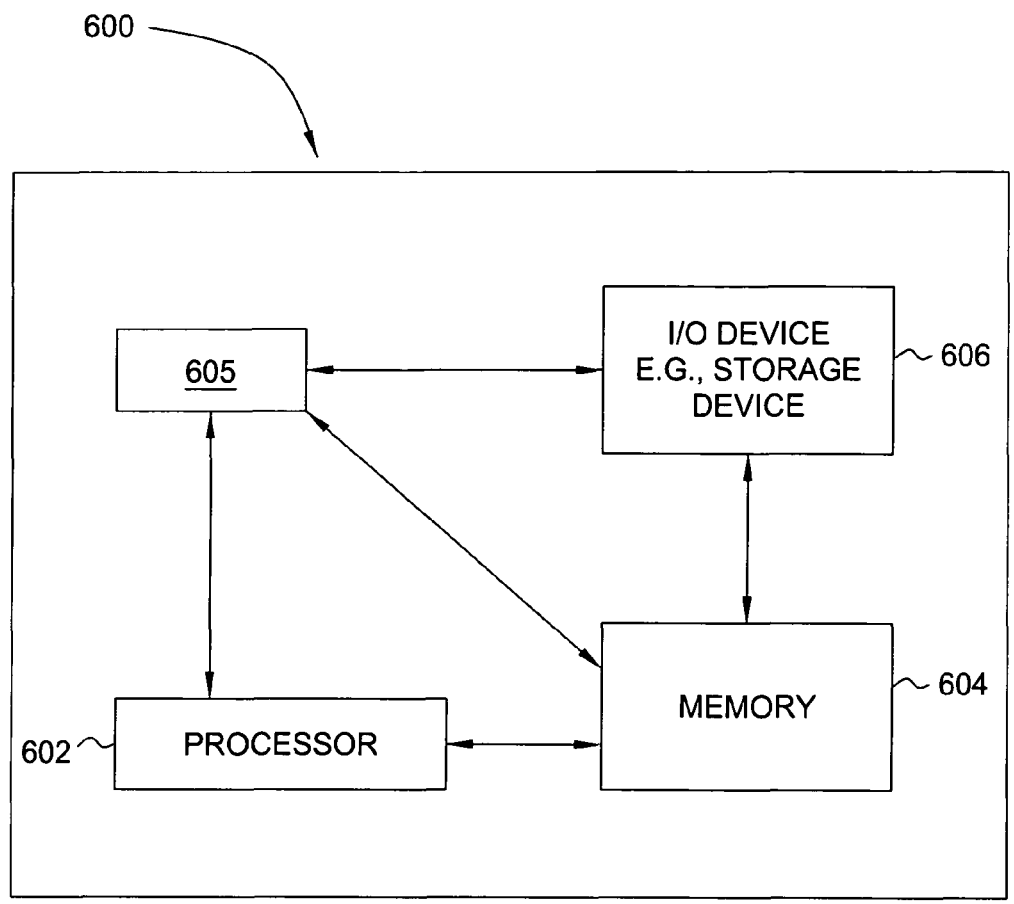
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing behavior models as service descriptions, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing behavior models as service descriptions can be loaded into memory 604 and executed by processor 602 to implement the functions as discussed above. As such, the present process 605 for providing behavior models as service descriptions (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing service discovery, comprising:
receiving, via a processor, a query generated by a user using a generalized scenario tree view tool for discovering a service, wherein the query comprises a task requirement;
searching a registry in accordance with the query for identifying a candidate service that satisfies the query, wherein the registry comprises a plurality of service descriptions corresponding to a plurality of service nodes, where each one of the service descriptions is provided in accordance with a behavior model that describes a service provided by a respective one of the plurality of service nodes and, wherein the behavior model is constructed by a respective one of the plurality of service nodes, wherein the behavior model standardizes shared domain ontologies that define terminology for a service provided by the respective one of the plurality of service nodes; and
monitoring the service provided by the respective one of the plurality of service nodes in response to the query to ensure that the service complies with the behavior model provided by the respective one of the plurality of service nodes.

2. The method of claim 1, wherein the query is a temporal logic query.

3. The method of claim 2, wherein the task requirement comprises a property of the task requirement.

4. The method of claim 3, wherein the candidate service satisfies the temporal logic query if the property of the task requirement is satisfied.

5. The method of claim 1, wherein the behavior model is implemented in accordance with an open model modeling language.

6. The method of claim 1, further comprising:
validating the candidate service.

7. The method of claim 1, further comprising:
monitoring an execution of the candidate service.

8. A computer-readable medium having stored thereon a plurality of instructions, the plurality of instructions including instructions which, when executed by a processor, cause the processor to perform method for performing service discovery, comprising:
receiving, via a processor, a query generated by a user using a generalized scenario tree view tool for discovering a service, wherein the query comprises a task requirement;
searching a registry in accordance with the query for identifying a candidate service that satisfies the query, wherein the registry comprises a plurality of service descriptions corresponding to a plurality of service nodes, where each one of the service descriptions is provided in accordance with a behavior model that describes a service provided by a respective one of the plurality of service nodes and, wherein the behavior model is constructed by a respective one of the plurality of service nodes, wherein the behavior model standardizes shared domain ontologies that define terminology for a service provided by the respective one of the plurality of service nodes; and
monitoring the service provided by the respective one of the plurality of service nodes in response to the query to ensure that the service complies with the behavior model provided by the respective one of the plurality of service nodes.

9. The computer-readable medium of claim 8, wherein the query is a temporal logic query.

10. The computer-readable medium of claim 9, wherein the task requirement comprises a property of the task requirement.

11. The computer-readable medium of claim 10, wherein the candidate service satisfies the temporal logic query if the property of the task requirement is satisfied.

12. The computer-readable medium of claim 8, wherein the behavior model is implemented in accordance with an open model modeling language.

13. The computer-readable medium of claim 8, further comprising:
validating the candidate service.

14. The computer-readable medium of claim 8, further comprising:
monitoring an execution of the candidate service.

15. An apparatus for performing service discovery, comprising:
means for receiving, via a processor, a query generated by a user using a generalized scenario tree view tool for discovering a service, wherein the query comprises a task requirement;
means for searching a registry in accordance with the query for identifying a candidate service that satisfies the query, wherein the registry comprises a plurality of service descriptions corresponding to a plurality of service nodes, where each one of the service descriptions is provided in accordance with a behavior model that describes a service provided by a respective one of the plurality of service nodes and, wherein the behavior model is constructed by a respective one of the plurality of service nodes, wherein the behavior model standardizes shared domain ontologies that define terminology for a service provided by the respective one of the plurality of service nodes; and
means for monitoring the service provided by the respective one of the plurality of service nodes in response to the query to ensure that the service complies with the behavior model provided by the respective one of the plurality of service nodes.

16. The apparatus of claim 15, wherein the query is a temporal logic query.

17. The apparatus of claim 16, wherein the task requirement comprises a property of the task requirement.

18. The apparatus of claim 17, wherein the candidate service satisfies the temporal logic query if the property of the task requirement is satisfied.

19. The apparatus of claim 15, further comprising:
means for validating the candidate service.

20. The apparatus of claim 15, further comprising:
means for monitoring an execution of the candidate service.

* * * * *